May 7, 1935. G. M. TEAGUE 2,000,676
MEANS FOR MAKING CONFECTIONS
Filed July 7, 1932 2 Sheets-Sheet 1
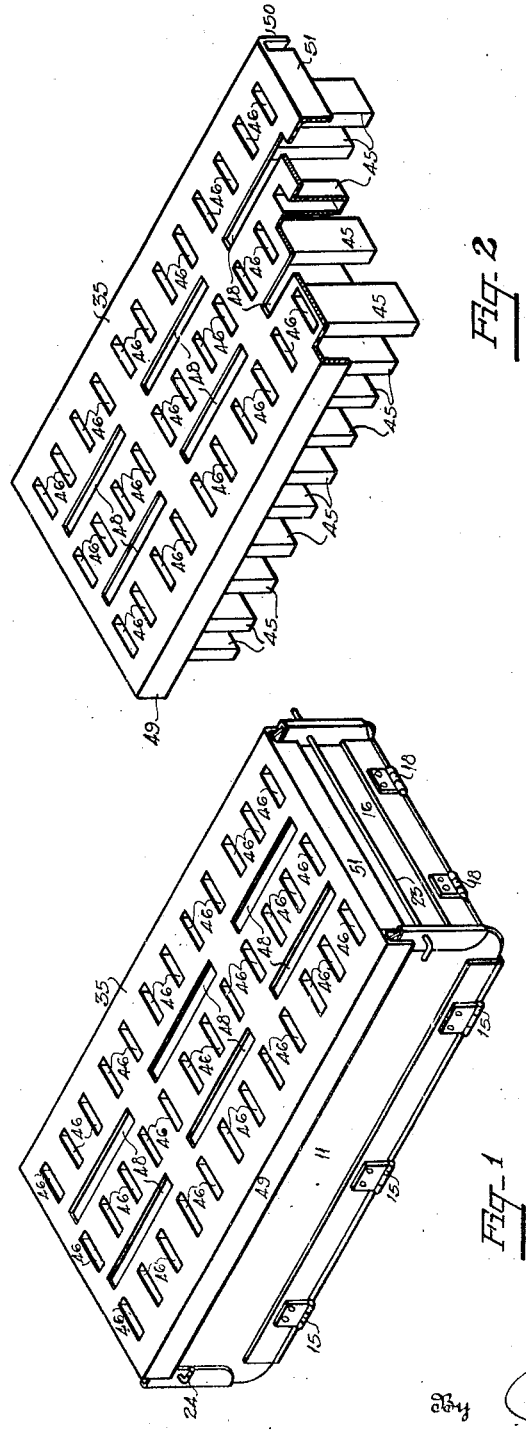
Inventor
GILES M. TEAGUE May 7, 1935. G. M. TEAGUE 2,000,676
MEANS FOR MAKING CONFECTIONS
Filed July 7, 1932 2 Sheets-Sheet 2
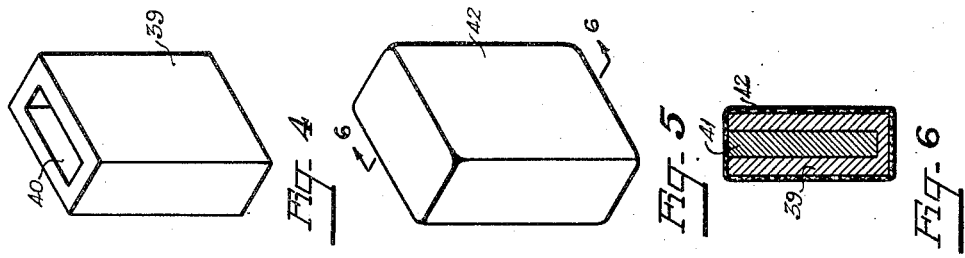
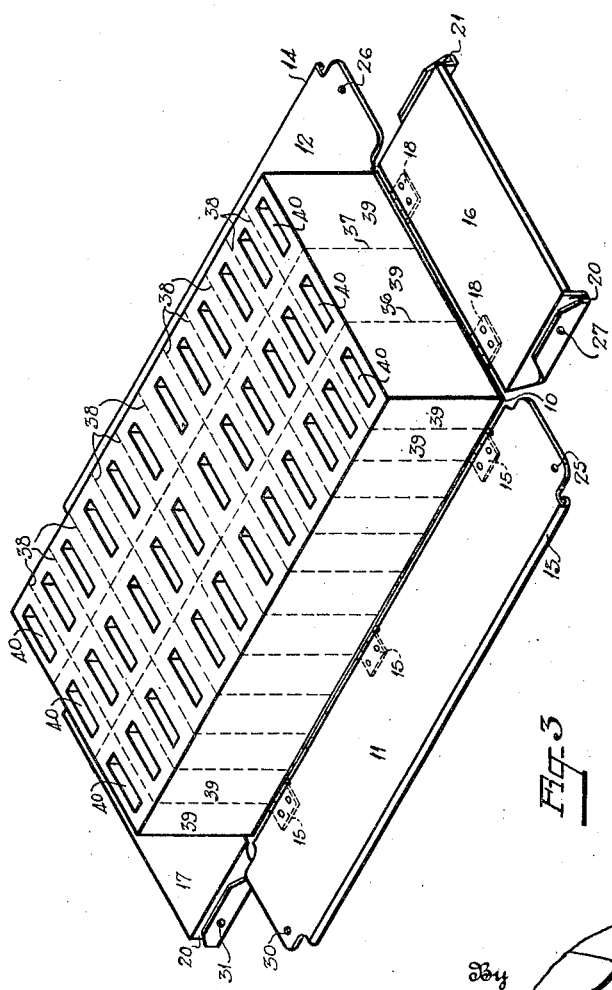
Inventor:
GILES M. TEAGUE
By Paul S Eaton
Attorney Patented May 7, 1935

2,000,676

UNITED STATES PATENT OFFICE 2,000,676

MEANS FOR MAKING CONFECTIONS

Giles M. Teague, Charlotte, N. C.

Application July 7, 1932, Serial No. 621,222

2 Claims. (Cl. 53—6)

This invention relates to a method and means for producing an edible confection and to the confection itself, wherein means are provided for forming a shell like member of cake or edible material in quantities and baking the cake and then cutting the containers apart from each other for filling with ice cream, sherbert, or any other suitable edible material and then dipping the shell like cake into a bath of chocolate and the like to form a coating entirely around the cake with the ice cream therein to form an edible confection and one which retains its shape not only on account of the fact that the cake is form retaining, but this is aided by the chocolate or other edible covering which, to a degree, insulates the ice cream contained within the cake in association with the cake itself. The cake surrounded by the covering such as chocolate forms an insulating medium for the ice cream which is much more efficient than merely covering the ice cream with a chocolate covering. Furthermore, the confection thus produced does not permit, under ordinary temperatures, in storage cabinets or refrigeration compartments, the melting of the ice cream and, therefore, the cake is preserved in a crisp state and does not become spongy.

Some of the objects of the invention having been stated, other objects will appear as the description proceeds when taken in connection with the accompanying drawings, in which—

Figure 1 is an isometric view of the cake baking apparatus in folded position with lid on and filled with dough and ready for insertion into a baking oven;

Figure 2 is an isometric view of the cover portion for the baking apparatus showing portions thereof broken away;

Figure 3 is a perspective view of the cake baking apparatus with the cover as shown in Figure 2 removed and with the sides unfolded showing the finished product ready to be cut into a plurality of pieces;

Figure 4 is a view of one of the pieces of cake after it is cut from the bulk as shown in Figure 3;

Figure 5 is a view of the cake after it has been filled with ice cream or other edible material and dipped in a bath of chocolate or other suitable edible material;

Figure 6 is a vertical sectional view taken along the line 6—6 in Figure 5.

Referring more particularly to the drawings, the numeral 10 indicates the base portion of the baking apparatus having side portions 11 and 12, said portions being curled as at 13 and 14 respectively and being hinged as at 15, the hinges for member 12 not being shown but being identical to those for member 11. At each end of member 10 are hinged the end portions 16 and 17 as at 18, the hinges for member 17 not being shown but being identical to the hinges for member 16. Both members 16 and 17 have grooves 20 and 21 therein which are adapted to fit over the end portions of members 11 and 12 when members 11 and 12 are in raised position.

In folded position, as shown in Figure 1, suitable securing means such as a rod 23 is passed thru holes 25 and 26 in members 11 and 12 and thru holes 27 in portions 20 and 21 of end member 16. Rod 24 is passed thru holes 30 in members 11 and 12 and thru holes 31 in member 17 to bind the side and end portions together. With the parts folded as described, a small amount of suitable cake dough or other edible material subject to being baked is placed in the container, the proper amount of dough is placed therein to cause it to rise to the proper height in the baking operation, then lid member 35 is inserted into the mass of dough and the baking operation is carried out and the finished product is shown in Figure 3 ready to be cut apart.

The finished product is cut along the lines 36 and 37 longitudinally and along all of the lines 38 transversely to form the finished product 39 as shown in Figure 4 with the cavity 40 therein. This cavity 40 is then filled with ice cream or any other suitable edible material 41 and the member 39 thus filled is dipped into a bath of chocolate or other form sustaining and form retaining edible material indicated at 42 to form a seal for the ice cream and to completely enclose both the ice cream and the cake container therefor.

The peculiar structure of the lid member is illustrated in Figure 2 in which a plurality of hollow members 45 rectangular in cross section are made integral with or rigidly secured to lid member 35 and the inside of each of said hollow members 45 communicates with its associated slot 46 in lid member 35 whereby the heat generated in the oven is allowed to pass thru slots 45 and into the said hollow members to aid in the baking operation. This lid member also has slots 48 to aid in the penetration of heat against the cake dough contained in the container. Member 35 has downwardly projecting side portions 49 and 50 which fit over the upper edges of members 11 and 12 when in assembled position as shown in Figure 1. The member 35 also has down-turned end portion 51 to fit over the upper edges of the end members 16 and 17.

I have found that best results are obtained by taking the cake when it is baked and before cutting it into sections, and placing it in a refrigeration compartment and allowing the same to become chilled, but not frozen, and then removing the cake from the refrigeration compartment and then immediately pouring the partially frozen filler such as ice cream into the cavities and then placing the cake in a freezing apparatus and thoroughly freezing the filler in the cavities which filler may be ice cream or any other suitable edible material and after freezing immediately cutting the cake into sections along lines 36, 37 and 38 and dipping the individual portions into the bath of molten chocolate and the like.

This method prevents the cake container from melting a portion of the cream, as would occur should the frozen confection such as ice cream be placed in the container without first chilling said container. This causes the cake container to be crisp and fresh until consumption which may be days or weeks later than the date of manufacture, it only being necessary to store the finished product in a refrigeration compartment having freezing temperature.

In the drawings and specification, I have set forth a preferred embodiment of my invention, and although specific terms are employed, they are used in a generic and descriptive sense only, and not for purposes of limitation, the scope or the invention being set forth in the appended claims:

1. Apparatus for baking a cake having a plurality of cavities therein, comprising a base, sides and ends pivotally secured to said base, a top having downturned flanges at its ends and sides for holding the sides and ends in vertical position, said top having a plurality of openings therein to admit heat to the top of the dough being baked, said top having a plurality of other openings therein, a hollow shell surrounding each of said other openings and extending downwardly towards the said base whereby heat is admitted directly to the interior of the shells.

2. Apparatus for baking a cake having a plurality of cavities therein, comprising a base, sidewalls and endwalls pivotally secured to said base, the endwalls having flanges thereon for fitting over the ends of the sidewalls when in operative position, the sidewalls and the endwalls having registering holes therein, a rod insertable in said holes for securing the sidewalls and endwalls together, a lid member for said apparatus having downturned flanges fitting on the outside of the sidewalls and endwalls when they occupy vertical positions, said lid having a plurality of openings therein, a shell member surrounding each of said openings and secured to the lower surface of the lid member and projecting downwardly towards said base to form cavities in the cake, the openings admitting heat directly to the interior of the shell members.

GILES M. TEAGUE.